United States Patent
Savoly et al.

(10) Patent No.: US 6,774,146 B2
(45) Date of Patent: Aug. 10, 2004

(54) DISPERSANT AND FOAMING AGENT COMBINATION

(75) Inventors: Arpad Savoly, Martinsville, NJ (US); Dawn P. Elko, Flemington, NJ (US); Bennie Veal, Rome, GA (US); James McCrary, Silver Creek, GA (US)

(73) Assignee: GEO Specialty Chemicals, Inc., Cleveland, OH (US)

(*) Notice: Subject to any disclaimer, the term of this patent is extended or adjusted under 35 U.S.C. 154(b) by 95 days.

(21) Appl. No.: 10/214,467

(22) Filed: Aug. 7, 2002

(65) Prior Publication Data

US 2004/0028956 A1 Feb. 12, 2004

(51) Int. Cl.[7] ............................................. C04B 11/024
(52) U.S. Cl. ........................ 516/66; 516/126; 516/909; 106/678; 106/680
(58) Field of Search ............................ 516/53, 66, 126, 516/905, 909; 428/703; 106/680, 678

(56) References Cited

U.S. PATENT DOCUMENTS

| | | | |
|---|---|---|---|
| 2,141,569 A | | 12/1938 | Tucker |
| 3,193,575 A | | 7/1965 | Nebel et al. |
| 3,686,133 A | | 8/1972 | Hattori et al. |
| 4,156,615 A | | 5/1979 | Cukier |
| 4,184,887 A | * | 1/1980 | Lange et al. ................ 106/781 |
| 4,460,720 A | | 7/1984 | Gaidis et al. |
| 4,518,652 A | * | 5/1985 | Willoughby ............. 428/312.4 |
| 4,601,758 A | * | 7/1986 | Nelson ...................... 523/130 |
| 4,676,835 A | | 6/1987 | Green et al. |
| 4,678,515 A | | 7/1987 | Green et al. |
| 4,725,665 A | | 2/1988 | Pieh et al. |
| 4,853,085 A | | 8/1989 | Johnstone et al. |
| 5,158,612 A | | 10/1992 | Savoly et al. |
| 5,240,639 A | | 8/1993 | Diez et al. |
| 5,250,578 A | | 10/1993 | Cornwell |
| 5,714,001 A | | 2/1998 | Savoly et al. |
| 6,171,388 B1 | | 1/2001 | Jobbins |
| 6,492,450 B1 | * | 12/2002 | Hsu .......................... 524/423 |

FOREIGN PATENT DOCUMENTS

CA 2003989 6/1990

OTHER PUBLICATIONS

PCT International Search Report for corresponding PCT/US03/22391 mailed Oct. 1, 2003, four pages.

* cited by examiner

Primary Examiner—Stephen Stein
(74) Attorney, Agent, or Firm—Rankin, Hill, Porter & Clark LLP

(57) ABSTRACT

The present invention provides a dispersant and foaming agent combination that is useful in the production of gypsum wallboard and other aqueous cementitious products. The dispersant in the combination according to the invention is a naphthalene sulfonate-aldehyde condensate alkali salt polymer having a weight average molecular weight of from about 17,000 to about 47,000. The alkali is preferably an alkali metal and/or an alkaline earth metal. The aldehyde is preferably formaldehyde. The foaming agent used in the combination according to the invention is a soap, preferably an alkali salt of an alkyl ether sulfate and/or an alkyl sulfate. The combination of a high molecular weight dispersant and a foaming agent produces a gypsum wallboard core effect that more efficiently entrains air (i.e., creates void space), thereby lowering overall board weight without detrimentally affecting strength.

3 Claims, 1 Drawing Sheet

DISPERSANT AND FOAMING AGENT COMBINATION

FIELD OF INVENTION

The present invention relates to a dispersant and foaming agent combination that is useful in the production of gypsum wallboard and other aqueous cementitious products, a method of forming a gypsum wallboard and a gypsum wallboard.

BACKGROUND OF THE INVENTION

Gypsum wallboard is used in the construction of residential and commercial buildings to form interior walls and ceilings. Because it is relatively easy to install and requires minimal finishing, gypsum wallboard is preferred over plaster in almost all applications.

Gypsum wallboard consists of a hardened gypsum-containing core surfaced with paper or other fibrous material suitable to receive a coating such as paint. It is common to manufacture gypsum wallboard by placing an aqueous core slurry comprised predominantly of calcined gypsum between two sheets of paper thereby forming a sandwich structure. The aqueous gypsum core slurry is allowed to set or harden by rehydration of the calcined gypsum, usually followed by heat treatment in a dryer to remove excess water.

Conventionally in the manufacture of gypsum board, a pre-generated foam is added to the board core slurry mix to decrease the weight of the gypsum board. This foam is generated from a mixture of a liquid foaming agent, air and water in a suitable foam generating apparatus. The foamed gypsum slurry is then deposited upon a moving paper substrate, which, itself, is supported on a long moving belt. A second paper substrate is then applied on top of the slurry to constitute the second face of the gypsum board and the sandwich passes through a forming station, which determines the width and thickness of the gypsum board. In such a continuous operation the gypsum slurry begins to set immediately after passing through the forming station. When sufficient setting has occurred the board is cut into commercially acceptable lengths and then passed into a board dryer. Thereafter the board is trimmed, bundled, shipped, and stored prior to sale.

The majority of gypsum wallboard is sold in sheets that are four feet wide and eight feet long. The thickness of the sheets varies from about one-quarter inch to about one inch depending upon the particular grade and application, with a thickness of about one-half inch being most common. A variety of sheet sizes and thicknesses of gypsum wallboard are produced for various applications.

Gypsum wallboard is relatively dense (approximately 43.2 lbs/ft$^3$), which equates to an overall weight of about 1,800 pounds per thousand square feet of one-half inch wallboard. Weight, rather than volume, determines the amount of gypsum wallboard that can be shipped by truck, and freight charges add significantly to the final cost of gypsum wallboard. Thus, it would be highly desirable to be able to reduce the overall weight of gypsum wallboard so that additional sheets could be shipped per truck. In addition, a lighter gypsum wallboard would be easier to handle and install at building sites.

As noted above, it is common practice to introduce air bubbles into the aqueous gypsum core slurry to create voids in the hardened core. The introduction of air bubbles reduces the density of the gypsum wallboard and also reduces the amount of water necessary to produce a workable core slurry. Air bubbles are typically formed via the addition of foaming agents during the formation of the slurry or by adding externally generated foam to the slurry. The externally generated foam is normally produced by incorporating air or other gas into an aqueous solution of a foaming agent, which is then mixed with the slurry. Commercial gypsum wallboard typically contains about 70% air (or void space) by volume. About 30% of that volume results from entrained air bubbles that are formed via the use of foaming agents.

As noted in Jobbins, U.S. Pat. No. 6,171,388, as the volume of air bubbles in gypsum wallboard increases, the strength of the wallboard tends to dramatically decrease, making the wallboard commercially unacceptable. Jobbins further notes at col. 1, lines 42–45, that "[e]xperience has taught that entrainment of air alone will not product a sufficiently improved lightweight wallboard that has adequate strength." Generally speaking, a gypsum wallboard must be able to pass the objective testing criteria set forth in the ASTM C36 and C473-00 standards in order to be commercially acceptable.

Prior art attempts to reduce the weight of gypsum wallboard have involved dispersing lightweight particles (e.g., expanded vermiculite, perlite, or expanded thermoplastic polymeric resins) into the aqueous gypsum core slurry, or more recently, incorporating a latex emulsion and an excess amount of a nonionic surfactant or an acrylic polymer into the aqueous gypsum core slurry. Some of these methods are effective at reducing the overall weight of the gypsum wallboard, but are expensive and/or present other problems. Thus, prior art efforts to create lightweight gypsum wallboard have met with limited success.

In addition to freight costs discussed above, another significant factor adding to the final cost of gypsum wallboard is the energy required to remove excess water from the slurry during curing and drying. A certain amount of water is required to hydrate the dry calcined gypsum material, but in order to obtain a smooth, free-flowing, low viscosity mixture that can be formed into a sheet in a mold, it has been necessary to add two or three times as much water to the slurry as is needed for hydration. It would be highly desirable to reduce the amount of excess water that is necessary during the production of gypsum wallboard.

SUMMARY OF INVENTION

The present invention provides a dispersant and foaming agent combination that is useful in the production of gypsum wallboard and other aqueous cementitious products, a method of forming a gypsum wallboard and a gypsum wallboard. The dispersant and foaming agent combination according to the invention increases the void size of air that is entrained in the gypsum wallboard increasing the strength of the wallboard (via nail pull), thereby allowing one to reduce the density and overall weight of the final product. Furthermore, the dispersant and foaming agent combination according to the invention reduces the amount of water required to obtain a free-flowing aqueous core slurry, which reduces the energy costs necessary to cure and dry the gypsum wallboard thereby decreasing production time.

The dispersant used in the combination according to the invention is a naphthalene sulfonate-aldehyde condensate alkali salt polymer having a weight average molecular weight of from about 17,000 to about 47,000. The alkali is preferably an alkali metal and/or an alkaline earth metal. The aldehyde is preferably formaldehyde. The foaming agent used in the combination according to the invention is a soap, and preferably an alkali salt of an alkyl ether sulfate and/or an alkyl sulfate.

Conventional dispersants used in the production of gypsum wallboard typically have a weight average molecular weight of from about 8,000 to about 14,000. At these molecular weights the molecular weight differences have negligible effect on efficiency of the dispersant, and at this molecular weight, there is virtually no detectable interaction between the dispersant and foaming agents. Applicants have surprisingly discovered that when a higher molecular weight dispersant is used, the dispersing effect is increased, and an synergistic interaction occurs between the dispersant and the foaming agent that produces a gypsum wallboard core effect that more efficiently entrains air (i.e., creates void space).

The core of a gypsum wallboard formed using the dispersant and foaming agent combination according to the invention includes large air bubbles (i.e., large void spaces) with small air bubbles (i.e., small void spaces) dispersed throughout. Despite the substantial increase in the volume of air bubbles or void spaces in the hardened core, gypsum wallboard formed using the dispersant and foaming agent combination according to the invention exhibits a higher nail pull value than gypsum wallboard formed using a conventional dispersant and a foaming agent at the same solids loading ratio.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

Figure 1:
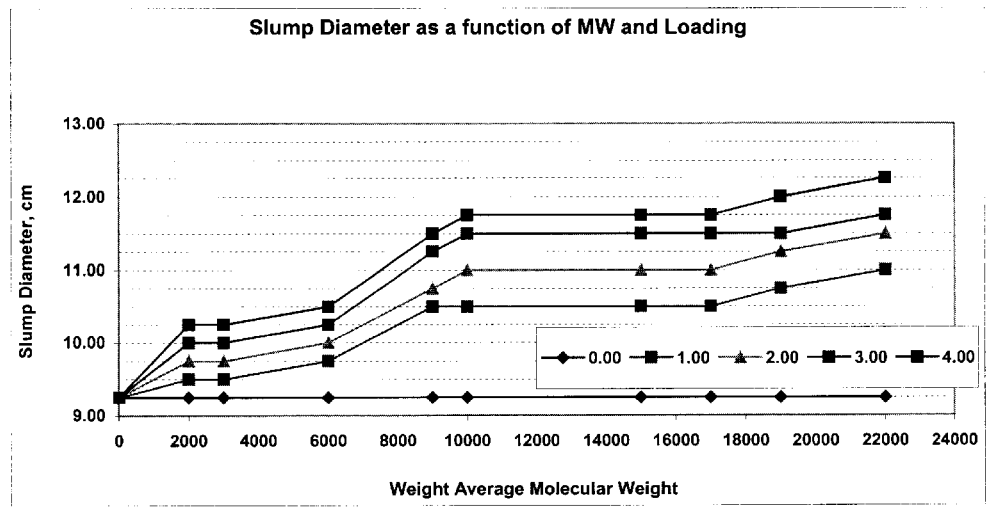
FIG. 1 is a graph showing slump diameter as a function of molecular weight and dosage.

The dispersant used in the combination according to the invention comprises a naphthalene sulfonate-aldehyde condensate salt polymer, and more preferably an alkali metal and/or an alkaline earth metal naphthalene sulfonate-aldehyde condensate polymer. Naphthalene sulfonate-aldehyde condensate salt polymers are well known in the art, and are described, for example, in Tucker, U.S. Pat. No. 2,141,569, Hattori et al., U.S. Pat. No. 3,686,133, and Pieh et al., U.S. Pat. No. 4,725,665. They are prepared by sulfonating naphthalene and/or alkyl naphthalene (where the alkyl group contains from about 1 to about 9 carbon atoms) with concentrated sulfuric acid, oleum (also known as fuming sulfuric acid), chlorosulfonic acid and/or sulfur trioxide at a mole ratio of acid to aromatic of from about 0.5 to about 1.5, and more preferably about 0.75 to about 1.4. Sulfonation is typically accomplished at a temperature of from about from about 15° C. to about 190° C., and more preferably from about 40° C. to about 170° C., and most preferably from about 140° C. to about 160° C.

The naphthalenesulfonic acid thus formed is then condensed with an aldehyde. Formaldehyde is the presently most preferred aldehyde for use in the invention, but paraformaldehyde, gluteraldehyde, and other conventional aldehydes can also be used. A variety of condensation methods can be employed, including continuous, incremental, or all-at-once addition of the aldehyde to the aqueous aromatic mass. The degree of polymerization is such that when using a standard GPC column, and sulfonated polystyrene as a standard, the weight average molecular weight is from about 17,000 to about 47,000, and most preferably about 22,000.

It is critical to the practice of the invention that the weight average molecular weight of the naphthalene sulfonate-formaldehyde condensate salt polymer be at least about 17,000. At molecular weights below 17,000, there is very little, if any, detectable interaction between the dispersant and the foaming agent. It is possible to produce naphthalene sulfonate-formaldehyde condensate salt polymers having weight average molecular weights as high as about 60,000, but at molecular weights above 47,000, the viscosity of the polymer becomes so high that there is a significant risk of not being able to remove the polymer from the reactor vessel.

After the condensation reaction, the condensate is brought to a pH preferably between 7 and 9 using an alkali, most preferably an aqueous solution of an alkali and/or an alkaline earth metal base. The alkali reacts with the condensate to form a salt polymer, most preferably an alkali metal and/or an alkaline earth metal naphthalene sulfonate-aldehyde condensate salt polymer. Suitable alkalis for use in the invention include, for example, the hydroxides, oxides, and carbonates of ammonium, sodium, potassium, and calcium.

It will be appreciated that the weight average molecular weight of the resulting naphthalene sulfonate-aldehyde condensate salt polymer may be adjusted by varying the mole equivalents of aldehyde that are reacted with the sulfonated naphthalene during the condensation reaction. A mole ratio of formaldehyde to naphthalene sulfonate of about 1.25:1.00 will result in the production of a naphthalene sulfonate-formaldehyde condensate salt polymer having a weight average molecular weight of about 22,000, which is presently most preferred. Reducing the mole ratio of aldehyde to naphthalene sulfonate will result in a naphthalene sulfonate-aldehyde condensate salt polymer having a lower weight average molecular weight.

The salt polymer can be used to disperse a variety of particles in aqueous media. In the presently most preferred embodiment of the invention, the salt polymer is used in combination with conventional foaming agents in the production of gypsum wallboard to reduce the viscosity of the aqueous gypsum core slurry. The salt polymer can also be used in the production of other aqueous cementitious products such as Portland cement, concrete and mortar.

The foaming agent used in the combination according to the invention comprises a soap, most preferably an alkali salt of an alkyl ether sulfate and/or an alkyl sulfate. Foaming agents of this type are well known in the industry, and are disclosed in, for example, Cukier, U.S. Pat. No. 4,156,615; Green et al., U.S. Pat. Nos. 4,618,370, 4,6767,835, and 4,678,515; Diez et al., U.S. Pat. No. 5,240,639; and Savoly et al., U.S. Pat. Nos. 5,158,612 and 5,714,001, all of which are hereby incorporated by reference in their entirety. The most preferred foaming agents for use in the invention are mixtures of alkyl sulfates and alkyl ether sulfates in specific ratios, as disclosed in Savoly et al., U.S. Pat. Nos. 5,158,612 and 5,714,001.

There are other ways of forming foaming agents, such as blending fatty alcohols with alkoxylated fatty alcohols, followed by sulfation of the blend with a sulfating agent such as $SO_3$, and then neutralization with a base, such as $NH_4OH$. Alternatively, about one mole of a linear and/or branched alcohol (preferably a $C_8$ to $C_{10}$ alcohol) can be reacted with about 0.01 to just less than 0.4 moles, and most preferably 0.05 to 0.3 moles of ethylene oxide in the presence of a catalyst to incorporate the oxyethylene groups. Typical examples of such catalysts include NaOH and KOH. Once the oxyethylene groups are incorporated, the alkoxylated fatty alcohols are then conventionally sulfated with a sulfating agent such as $SO_3$, and then conventionally neutralized with a base such as $NH_4OH$, to obtain the foaming agent. Typical examples of cations producing a water soluble surfactant include sodium, potassium, magnesium, ammonium, and organic derivatives thereof, such as triethanolamine and the like. Presently preferred cations are ammonium and organic derivatives thereof.

As noted above, naphthalene sulfonate-aldehyde condensate salt polymers and alkyl sulfate and/or alkyl ether sulfate foaming agents have been present together in prior art aqueous gypsum core slurries. However, prior art naphthalene sulfonate-aldehyde condensate salt polymers have a weight average molecular weight within the range of from about 8,000 to about 14,000, and most typically of about 10,000 to 12,000. At this molecular weight, there is no detectable interaction whatsoever between the naphthalene sulfonate-aldehyde condensate salt polymer and the foaming agent.

Applicants surprisingly discovered that the dispersing effect of a higher weight average molecular weight naphthalene sulfonate-aldehyde condensate salt polymer (e.g., 22,000) is superior to the dispersing effect obtained through the use of a similar polymer having a lower weight average molecular weight (e.g., 12,000) at the same solids loading ratio. At the same solids loading ratio, use of a higher weight average molecular weight naphthalene sulfonate-aldehyde condensate salt polymer (e.g., 22,000 versus 12,000) results in at least 15% reduction in the viscosity of the aqueous gypsum core slurry as measured by slump.

In addition to being a more efficient dispersant on a solids weight to solids weight basis, applicants have surprisingly discovered that a higher weight average molecular weight naphthalene sulfonate-aldehyde condensate salt polymer synergistically interacts with conventional foaming agents to produce a gypsum wallboard core structure that is substantially more efficient in entraining air bubbles or void spaces. The hardened gypsum-containing core structure includes large bubbles with small bubbles dispersed throughout. Contrary to conventional wisdom, gypsum wallboards formed using the dispersant and foaming agent combination according to the present invention have higher nail pulls as compared to gypsum wallboards formed using conventional dispersants and foaming agents. The higher nail pulls allow gypsum wallboard manufacturers to lower the overall board weight by at least 5% and still pass the objective testing criteria set forth in ASTM C36 and C473-00 standards. This allows manufacturers of gypsum wallboard to dry the lighter wallboard faster, using less energy, and to ship a larger number of sheets of gypsum wallboard per truck, which lowers the freight cost component.

The present invention also provides a method of fabricating a gypsum wallboard. In accordance with the method of the invention, an aqueous slurry comprising calcined gypsum, a naphthalene sulfonate-aldehyde condensate alkali salt polymer having a weight average molecular weight from about 17,000 to about 47,000 and a soap is formed. The slurry is molded into a sheet, preferably by conventional means. The calcined gypsum in the aqueous slurry is permitted to rehydrate. Any excess water remaining is removed from the sheet, which hardens to form a hardened wallboard.

The invention also relates to an improved gypsum board and particularly to a gypsum board having a decreased density, but which has an acceptable structural strength, e.g. compressive strength. Such strength allows the board to maintain its structural integrity in the vicinity of fasteners, e.g. nails, screws, etc., that may be driven into the board. A wallboard in accordance with the invention comprises a hardened gypsum-containing core having a layer of paper disposed thereon. Due to the improved strength of the gypsum-containing core, a lighter weight paper can be used. Paper having a weight of at least about 45 pounds per thousand feet is conventionally used in the fabrication of gypsum wallboard, but a wallboard according to the present invention can be formed using paper having a maximum weight of about 35 pounds per thousand square feet, yet still exhibit a nail pull resistance of at least about 77 pounds based upon a one-half inch board thickness as measured in accordance with the ASTM C473-00.

A wallboard formed in accordance with the invention will preferably have an overall weight rating of less than about 1,500 pounds per thousand square feet based upon a one-half inch board thickness. Conventional one-half inch thick gypsum wallboard has an overall weight rating of at least about 1,600 pounds per thousand square feet, and more conventionally of about 1,800 pounds per thousand square feet. Despite the lower weight, a wallboard in accordance with the invention will have a nail pull resistance of at least about 77 pounds based upon a one-half inch board thickness as measured in accordance with the ASTM C473-00.

The following examples are intended only to illustrate the invention and should not be construed as imposing limitations upon the claims. Unless otherwise stated, all temperatures are in degrees centigrade, all pressures are atmospheric, and all molecular weights reported are weight average molecular weights.

EXAMPLE 1

1.0 mole of naphthalene was added to a reaction vessel equipped with a condenser. The naphthalene was heated to 150° C. and stirred. 1.0 mole of sulfuric acid was added drop wise and the mixture was held at that temperature for 2 hours. The mixture was allowed to cool to 90° C. and 10 moles of water were added and the temperature was maintained. To this mixture, 1.25 moles of formaldehyde were added as a 37% by weight solution in water. The mixture was heated to 105° C. and stirred until all of the free formaldehyde was consumed. The reaction mixture was cooled to 50° C. and a 50% by weight solution of sodium hydroxide in water was added to the reaction mixture to adjust the pH thereof to 8. The weight average molecular weight of the resulting naphthalene sulfonate-formaldehyde condensate alkali salt polymer was determined to be about 22,000.

This reaction process was repeated using lower molar ratios of formaldehyde to naphthalene sulfonate to yield naphthalene sulfonate-formaldehyde condensate alkali salt polymers having weight average molecular weights of: 2,000; 3,000; 6,000; 9,000; 10,000; 15,000; 17,000; and 19,000.

EXAMPLE 2

50 grams of stucco (less any solids derived from the dispersant used) were placed into a mixing cup. 36 grams of water (less any water derived from the dispersant used) were placed into a second mixing cup. Various dosages of the dispersants formed in Example 1 were added to the water in the second mixing cup to approximate the pounds of dispersant that would be present per thousand square feet ("MSF") of dried, finished wallboard if the material had been used to form ½" gypsum wallboard. The stucco was added into the water/dispersant mixing cup and the components were blended by rapid hand stirring for 30 seconds. Immediately after mixing, the slurry was poured directly onto a clean glass surface from a height of 4 cm. A roughly uniform diameter disc was formed in each case. The discs were allowed to set thoroughly and when completely set (hardened/dried), were removed from the glass surface using a metal spatula. The discs were turned over and their diameters were measured across two set points through the center. The mean diameter of each disc was reported as Slump Diameter (cm). Table 1 below lists the Slump Diameter (cm) as a function of dispersant loading and dispersant molecular weight.

TABLE 1

|  | 2,000 MW | 3,000 MW | 6,000 MW | 9,000 MW | 10,000 MW | 15,000 MW | 17,000 MW | 19,000 MW | 22,000 MW |
| --- | --- | --- | --- | --- | --- | --- | --- | --- | --- |
| 1.00 LB/MSF | 9.50 | 9.50 | 9.75 | 10.50 | 10.50 | 10.50 | 10.50 | 10.75 | 11.00 |
| 2.00 LB/MSF | 9.75 | 9.75 | 10.00 | 10.75 | 11.00 | 11.00 | 11.00 | 11.25 | 11.50 |
| 3.00 LB/MSF | 10.00 | 10.00 | 10.25 | 11.25 | 11.50 | 11.50 | 11.50 | 11.50 | 11.75 |
| 4.00 LB/MSF | 10.25 | 10.25 | 10.50 | 11.50 | 11.75 | 11.75 | 11.75 | 12.00 | 12.25 |

Figure 2:
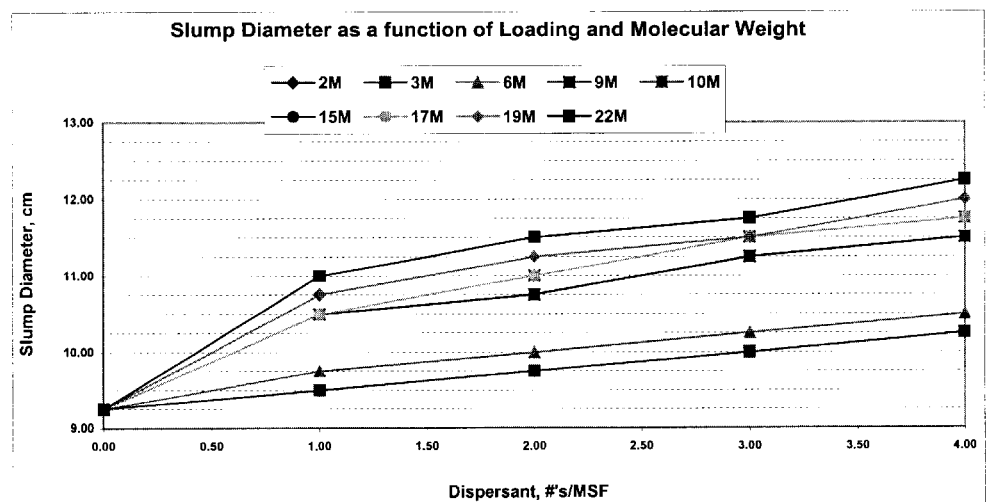
FIG. 2 is a graph showing slump diameter as a function of dosage and molecular weight.

The data in Table 1 is graphically depicted in FIGS. 1 and 2. FIG. 1 is a graph showing slump diameter as a function of molecular weight and dosage. FIG. 2 is a graph showing slump diameter as a function of dosage and molecular weight.

EXAMPLE 3

One-half inch thick gypsum wallboards were produced at a commercial wallboard plant operating at a line speed of 410 feet per minute. The aqueous gypsum slurries used to fabricate the wallboards were sandwiched between sheets of paper weighing 45 pounds per MSF. The aqueous gypsum slurries consisted of mixtures of 1,365 pounds per MSF of calcined gypsum, 10 pounds per MSF of accelerator (ball milled gypsum crystals), 470 pounds per MSF of gauging water, 470 pounds per MSF of raw water, 110 pounds per MSF of foam water, 8.5 pounds per MSF of starch, 0.5 pounds per MSF of fiberglass, 0.18 pounds per MSF of retarder (diethylenetriaminepentaacetic acid), and the loadings in pounds per MSF of dispersant from Example 1) and foaming agent specified in Table 2 below. "AES" is an alkyl ether sulfate foaming agent sold as HYONIC PFM 33, and "AES/AS" is a combination alkyl ether sulfate/alkyl sulfate foaming agent sold as HYONIC PFM 10, both of which are available from GEO Specialty Chemicals, Inc. of Cleveland, Ohio. After the boards were formed and fully hardened, they were weighed and then tested for nail pull resistance in accordance with the ASTM C-473-00 standard. The results are reported in Table 2 below.

TABLE 2

| Plant Trial | Dispersant ($MW_w$) | Dispersant Loading | Foaming Agent | Foaming Agent Loading | Board Weight (lbs/MSF) | Nail Pull (lbs) |
| --- | --- | --- | --- | --- | --- | --- |
| 3-A | 10,000 | 0.40 | AES | 0.225 | 1,609 | 75.5 |
| 3-B | 10,000 | 0.40 | AES/AS | 0.225 | 1,634 | 88.0 |
| 3-C | 22,000 | 0.40 | AES | 0.225 | 1,630 | 74.7 |
| 3-D | 22,000 | 0.40 | AES/AS | 0.410 | 1,641 | 96.0 |
| 3-E | 22,000 | 1.50 | AES | 0.410 | 1,667 | 83.5 |
| 3-F | 22,000 | 1.50 | AES/AS | 0.372 | 1,656 | 99.5 |
| 3-D | 22,000 | 2.50 | AES/AS | 0.372 | 1,563 | 85.3 |

EXAMPLE 4

One-half inch thick gypsum wallboards were produced at a commercial wallboard plant operating at a line speed of 410 feet per minute. The aqueous gypsum slurries used to fabricate the wallboards had the same general composition as set forth in Example 3 above (exclusive of dispersants and foaming agents). In Plant Trial 4-A, the aqueous gypsum slurry further comprised 4.0 pounds per MSF of the 22,000 weight average molecular weight dispersant formed in Example 1, but no foaming agent. In Plant Trial 4-B, the aqueous gypsum slurry further comprised 4.0 pounds per MSF of the 22,000 weight average molecular weight dispersant formed in Example 1 and 0.26 pounds per MSF of HYONIC PFM 10 foaming agent. Wallboards were formed by sandwiching the aqueous slurries between sheets of paper weighing 45 pounds per thousand square feet at a rate of 1,670 pounds of aqueous slurry per thousand square feet. The hardened finished wallboards were then tested for nail pull resistance. Wallboard formed in Plant Trial 4-A exhibited a mean nail pull resistance of 85.0 pounds in accordance with the ASTM C473-00 standard. Wallboards formed in Plant Trial 4-B exhibited a mean nail pull resistance of 94.4 pounds in accordance with the ASTM C473-00 standard.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A dispersant and foaming agent combination for use in the production of gypsum wallboard comprising:

a naphthalene sulfonate-aldehyde condensate alkali salt polymer having a weight average molecular weight from about 17,000 to about 47,000; and a soap;

wherein the aldehyde in the naphthalene sulfonate-aldehyde condensate alkali salt polymer is formaldehyde and the soap comprises a mixture of an alkyl sulfate and an alkyl ether sulfate.

2. The dispersant and foaming agent combination according to claim 1 wherein the naphthalene sulfonate-aldehyde condensate alkali salt polymer is a sodium salt.

3. The dispersant and foaming agent combination according to claim 1 wherein the naphthalene sulfonate-aldehyde condensate alkali salt polymer is a calcium salt.

* * * * *